July 2, 1940.  C. I. HALL  2,206,696
SPEED RESPONSIVE DEVICE
Filed April 29, 1938
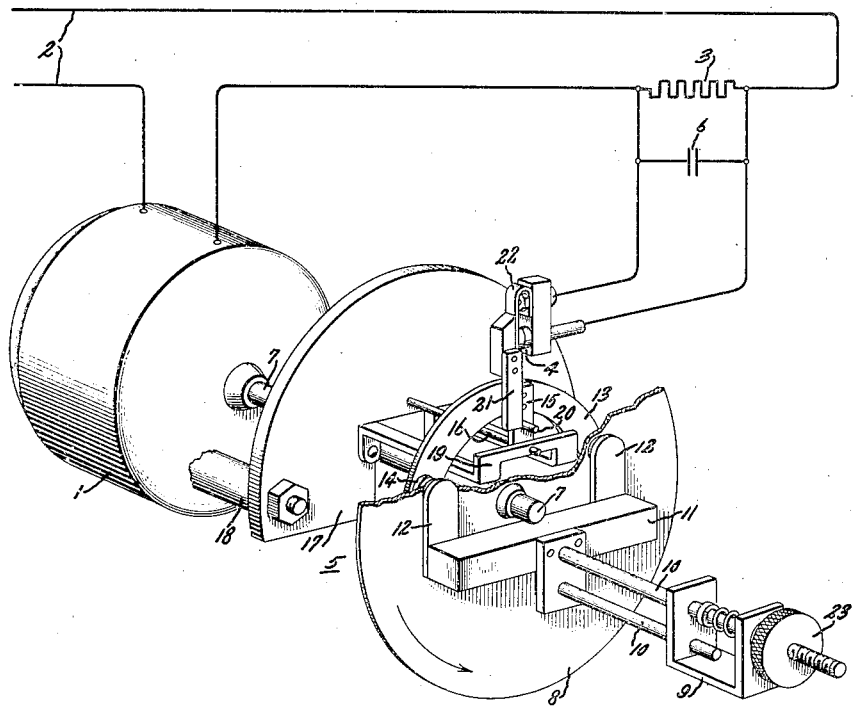
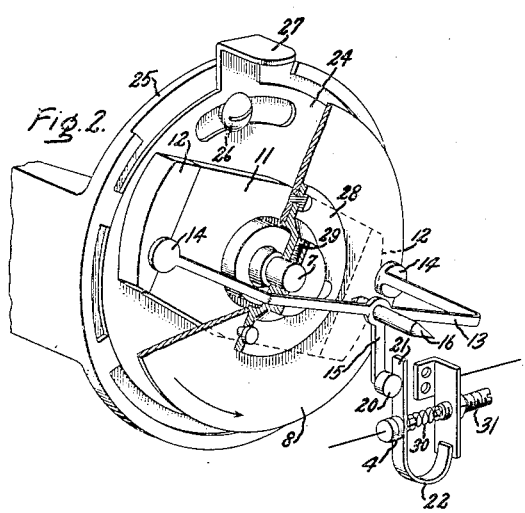
Inventor:
Chester I. Hall,
by Harry E. Dunham
His Attorney.

Patented July 2, 1940

2,206,696

UNITED STATES PATENT OFFICE 2,206,696

SPEED RESPONSIVE DEVICE

Chester I. Hall, Schenectady, N. Y., assignor to General Electric Company, a corporation of New York Application April 29, 1938, Serial No. 205,021

3 Claims. (Cl. 264—13)

This invention relates to magnetic speed responsive devices and it has for an object the production of a compact, reliable and accurate magnetic speed governing device.

A magnetic speed responsive device is one in which the magnetic drag between a relatively movable magnet and a conductor is used to produce an indication or operate control means. Heretofore, such devices have been relatively bulky in construction, have produced relatively weak operating forces and have been difficult to adjust.

In accordance with this invention there is provided a novel and simple magnetic speed responsive device in which the above disadvantages of previous devices of this kind have been eliminated.

The invention will be better understood from the following description taken in connection with the accompanying drawing and its scope will be pointed out in the appended claims.

In the drawing, Fig. 1 is a cutaway perspective view of one form of the invention arranged to control automatically the speed of an electric motor and Fig. 2 illustrates a modified form of the device shown in Fig. 1.

Referring now to the drawing and more particularly to Fig. 1, there is shown therein an electric motor 1 connected to be energized by a supply circuit 2. Connected in series with the motor is a resistance 3 which is arranged to be periodically short circuited by a pair of contacts 4 forming part of a magnetic speed governor 5. A conventional spark reducing capacitor 6 is connected in shunt to the contacts 4. Motor 1 is provided with a shaft 7 on the end of which is fastened an electrical conducting member 8. This member is preferably in the form of a disk and is preferably composed of low resistance nonmagnetic material, such as copper. Located at one side of the disk by means of a bracket 9 and rods 10 is a magnet 11. This magnet is preferably a permanent magnet and in order to obtain as high a flux density as possible its flux is collected by soft iron flux collecting pole pieces 12 having pole faces adjacent to and parallel to the surface of disk 3.

If the magnet is made of tungsten steel, I have found that in order to obtain an adequate amount of flux, it is necessary for the permanent magnet to have a relatively large ratio of length to cross section in terms of the same unit of measurement, such, for example, as a ratio between 5:1 and 10:1. This causes the device to be relatively bulky in construction so that its range of application is seriously limited. For example, it cannot readily be used to control automatically the speed of the motor of a household food mixing device. However, I have found that when the magnet is composed of an alloy containing as essential ingredients, iron, nickel and aluminum, as disclosed in Ruder Patents 1,947,274 and 1,968,569, and Mishima Patents 2,027,994 to 2,028,000, inclusive, the ratio of length to cross section can be reduced to the order of 2:1, thus, resulting in a very compact structure.

Mounted at the other side of disk 8 is a keeper or armature 13 of soft iron which is provided with circular pole pieces 14 for cooperating with the poles of the permanent magnet pole pieces 12. The keeper 13 is pivotally mounted by means of an arm 15 provided with an opening through which is passed a rod 16, one end of which is mounted in a bracket 17 fastened to the motor by means of studs 18 and the other end of which is fastened to a bracket 19 riveted to the bracket 17.

The keeper 13 has its polar area so proportioned with relation to the flux density that an optimum condition for torque is obtained. If the polar area is too great then the path of current flow in the disk 8 is of higher resistivity with resulting lower current values, thus, decreasing the torque. On the other hand, if the polar area is too small saturation will occur and this will reduce the total flux cutting the disk, thereby decreasing the torque. Not only must the polar area be of a particular size for optimum torque or drag but also it must have a particular shape. The drag when the area for optimum drag is circular is about twenty-three per cent greater than the drag when the area is square in shape, and I have found that the circular shape gives the highest drag. This is believed to be because for any given area the length and hence the resistance of the eddy current path will be a minimum for the circular shape.

Thus, I have discovered that there is a critical relation between the polar area and the torque for any given total flux. Areas greater or less than a particular critical value actually result in decreased drag. A statement of the criteria for the particular area giving maximum drag is that the maximum value of flux should pass through it at maximum flux density. If the area is increased above this value the flux density is reduced because the same value of total flux passes through a larger area. This reduces the magnitude of the eddy current because the length and resistance of its path are increased. Hence the drag, which is proportional to the product of flux and eddy current, is reduced. If the area is reduced below this value the total or maximum flux is decreased because saturation of the pole pieces limits the flux density to the maximum value. Hence the drag is again reduced.

Arm 15 carries a pin 20 which engages an arm 21 carrying one of the contacts 4. A spring 22 serves normally to bias the contacts toward their closed position.

For adjusting the amount of flux passing through the disk between the pole pieces, the upper one of the rods 10 is threaded and is provided with an adjusting thumb nut 23, whereby the magnet 11 may be moved toward or away from the disk. The closer the magnet is to the disk the shorter the air gap between the pole pieces and the less leakage flux there is which does not pass through the disk, whereas the further away the magnet is from the disk the greater the leakage flux and the less flux there is which passes through the disk.

The operation of Fig. 1 is as follows. Assume that circuit 2 is connected to any suitable source of current and that motor 1 turns disk 8 in a counter-clockwise direction, as indicated by the arrow. The rotation of the disk through the magnetic field between the pole pieces induces eddy currents therein which in turn set up magnetic poles in the disk and these poles serve to attract the poles of the keeper 13 in such a manner as to tend to drag these poles along in the direction of rotation of the disk. Consequently, the keeper tends to pivot around the shaft 16 and, thus, the pin 20 pushes against the arm 21 and tends to separate the contacts 4. At a predetermined speed of rotation of the disk, which speed is determined by the setting of the thumb nut 23, the magnetic drag on the keeper 13 will overcome the counter force of the spring 22 and the contacts 4 will separate, thus, connecting the resistor 3 in series with the motor and reducing its speed. However, as soon as the speed falls, the magnetic drag will be overpowered by the spring and the contacts will close again, thus, short circuiting the resistance and causing the motor to increase its speed. This intermittent action takes place very rapidly and holds the average motor speed substantially constant and renders the slight momentary fluctuations in speed unnoticeable.

This action of the governor is improved by an anti-hunting effect which is such that as soon as the keeper moves in a direction to cause opening of the contacts 4 the magnetic drag tending to move the keeper in this direction is decreased independently of any change in speed and similarly when the keeper member moves in the opposite direction under the influence of the spring 22 the magnetic drag tending to open the contacts is increased independently of any change in speed. This action arises by reason of the fact that the pole faces of the pole pieces 12 are normally in registration or directly opposite the pole faces 14 on the keeper, so that normally the reluctance of the air gaps between these pole faces is a minimum and the flux passing therebetween is a maximum. Therefore, as the keeper moves in a direction to open the contacts 4 the pole faces 14 move out of alignment with the faces of the pole pieces 12, thus increasing the reluctance of the air gaps and decreasing the flux which, therefore, decreases the magnetic drag even before a change in speed occurs. Consequently, as soon as the contacts separate there is a tendency for them to close again and as soon as they close there is a tendency for them to open again. This produces a relatively smooth and improved regulator action.

It has been found that the effect of the pole pieces 12 is very pronounced because the permanent magnet tends to keep its flux distributed but the soft iron pole pieces serve to collect this flux and produce the requisite relatively high flux density.

In the modification shown in Fig. 2 a still more compact arrangement is secured by increasing the cross sectional area of the magnet 11 relative to its length and making its soft iron pole pieces with pole faces having a tapering width in order to secure speed adjustment. As shown, the magnet 11 is mounted on a non-magnetic member 24 mounted on a suitable stationary bracket 25 by a screw 26 passing through an arcuate slot therein, whereby it may be rotated coaxially with the motor shaft by means of a suitable handle or extension 27. When the handle is moved to rotate the magnet in a counter-clockwise direction the area of the pole pieces 12 opposite the poles 14 increases, thereby increasing the flux and thus decreasing the speed setting of the device, whereas if the handle 27 is moved in the opposite direction so as to rotate the magnet 11 in a clockwise direction the area of the pole pieces 12 which is opposite the poles 14 decreases, thereby increasing the reluctance of the magnetic circuit and decreasing the flux with the result that the speed setting of the device is increased in that the disk 8 has to be rotated at a higher speed in order that the magnetic drag will overcome the counter force of the spring 22. The disk 8 is mounted on a suitable hub 28 which is fastened to the motor shaft by means of a set screw 29.

The operation of Fig. 2 is substantially the same as that of Fig. 1 and it will be observed that as the keeper 13 turns counter-clockwise under the influence of the magnetic drag its poles 14 move in the direction of decreasing area of the pole pieces 12, thus, providing an anti-hunting effect similar to that produced in Fig. 1.

A spring 30 and adjusting screw 31 are provided for securing an initial adjustment of the spring tension between the contacts 4.

If the device is to be used as a speed indicating means the position of the pin 20 or arm 15 will serve as an indication of speed and obviously any suitable scale may be provided for cooperation therewith if desired.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to obtain by Letters Patent of the United States is:

1. In a speed responsive device, the combination of a normally stationary iron-nickel-aluminum alloy permanent magnet having a ratio of length to cross section substantially less than 5:1 in terms of the same unit of measurement, soft iron circular pole pieces on said magnet for concentrating its flux in an area substantially less than the cross sectional area of said magnet, a movably mounted armature, said armature having circular poles mounted adjacent to but spaced from said pole pieces, a non-magnetic metal disk mounted for rotation between said permanent magnet pole pieces and said armature, said poles and pole pieces having pole faces of equal area and of such value that the maximum value of flux passes through said disk at maximum flux density, means for preventing movement of said armature until a predetermined speed of said disk is exceeded, and means for varying said predetermined speed comprising means for moving said permanent magnet so as to adjust the flux cut by said disk.

2. In a speed responsive device, the combination of a permanent magnet, an iron armature, and a non-magnetic metal disk mounted between said magnet and said armature, said magnet, disk and armature all being mounted for coaxial rotation, said armature having a pair of poles, said magnet having a pair of pole pieces for cooperating with the poles of said armature, said pole pieces having pole faces with a tapering width from across their length whereby rotation of said magnet varies their polar area with respect to the poles of said armature, and means for adjusting the angular position of said magnet.

3. The combination with a magnetic speed responsive device of the type in which a magnetic drag is produced on the pole of a pivotally-mounted armature member by eddy currents induced in a non-magnetic metal disk which rotates between said pole and the pole of a permanent magnet which sends magnetic flux through said disk from one of said poles to the other, of means for giving said torque an optimum value comprising a soft iron flux concentrating pole piece for at least one of said poles, said pole piece having a face parallel to said disk which is circular in outline and of such an area that the maximum flux from said permanent magnet passes through said disk at maximum flux density whereby the length and resistance of the eddy current path in the disk are a minimum and the flux through the disk is a maximum with the result that the product of flux and eddy current in the disk is a maximum.

CHESTER I. HALL.